United States Patent [19]
Matsui et al.

[11] Patent Number: 5,606,293
[45] Date of Patent: Feb. 25, 1997

[54] CLOCK GENERATOR FOR MICROCOMPUTER HAVING REDUCED START-UP TIME

[75] Inventors: Hideo Matsui; Terunori Kubo, both of Tokyo, Japan

[73] Assignee: Mitsubishi Denki Kabushiki Kaisha, Tokyo, Japan

[21] Appl. No.: 572,524

[22] Filed: Dec. 14, 1995

[30] Foreign Application Priority Data

Dec. 14, 1994 [JP] Japan .................................... 6-310635

[51] Int. Cl.⁶ .............................. G06F 1/08; H03B 5/32; H03K 3/012
[52] U.S. Cl. ........................... 331/74; 331/158; 331/173; 364/DIG. 1; 364/270.2
[58] Field of Search .................... 331/76, 74, 75, 331/173, 116 R, 116 FE, 158; 327/115, 117; 364/270, 270.2

[56] References Cited

U.S. PATENT DOCUMENTS

| | | | |
|---|---|---|---|
| 4,748,559 | 5/1988 | Smith et al. | 364/200 |
| 4,758,945 | 7/1988 | Remedi | 364/200 |
| 4,864,255 | 9/1989 | Yoshida | 331/75 |

*Primary Examiner*—Siegfried H. Grimm
*Attorney, Agent, or Firm*—Lowe, Price, LeBlanc & Becker

[57] ABSTRACT

A harmonic of a resonance frequency of an oscillator, which occurs at the initial stage of the oscillation of the oscillator, is divided to obtain a pulse to be used as a clock for the operation of a microcomputer before the oscillation is stabilized. Thus, the invention provides a clock generation circuit and a microcomputer which shorten a time period required from the application of power or the clock halt state to the start of the operation of the microcomputer.

18 Claims, 6 Drawing Sheets

CLOCK GENERATOR FOR MICROCOMPUTER HAVING REDUCED START-UP TIME

BACKGROUND OF THE INVENTION

1. Field of the Invention

The present invention relates to a circuit for generating a clock required for the operation of a microcomputer and a microcomputer including the clock generation circuit.

2. Description of Related Art

FIG. 1 is a block diagram of the configuration of a conventional microcomputer mainly around a clock generation circuit therein. As is shown in FIG. 1, a microcomputer 33 includes a clock generation circuit 103. Each electrode of a ceramic oscillator 10 is connected to each one terminal of load capacitances 11a and 11b which are grounded at the other terminals. A node between the ceramic oscillator 10 and the load capacitance 11a is connected to one input terminal of a NAND circuit 1. An output terminal of the NAND circuit 1 is connected to a node between the ceramic oscillator 10 and the load capacitance 11b. A negative feedback resistance 12 is interposed between the output terminal of the NAND circuit 1 and the one input terminal of the NAND circuit 1.

The other input terminal of the NAND circuit 1 is connected to a Q output terminal of a control register 5 for starting/stopping the oscillation of the ceramic oscillator 10. An S input terminal of the control register 5 is connected to an output terminal of an OR circuit 4 for outputting either an interruption signal or a reset signal for the microcomputer 33. The reset signal received by the OR circuit 4 is obtained by inverting a signal $\overline{\text{RESET}}$ by an inverter 3. A D input terminal and a clock (CK) input terminal of the control register 5 are connected to a CPU 16 of the microcomputer 33. An output terminal of the inverter 3 is also connected to the CPU 16.

An oscillation voltage generated by the ceramic oscillator 10 at the output terminal of the NAND circuit 1 is buffered by an inverter 2 to be shaped into a pulse, which is supplied to a counter 24. The pulse shaped by the inverter 2 is also supplied to one input terminal of an AND circuit 6. An overflow output Q of the counter 24 is supplied to an S input terminal of an R-S flip-flop 25. A Q output of the R-S flip-flop 25 is supplied to the other input terminal of the AND circuit 6.

A $\overline{\text{Q}}$ output terminal of the control register 5 is connected to one input terminal of an OR circuit 7 with the other input terminal being connected to the output terminal of the inverter 3. An output terminal of the OR circuit 7 is connected to R input terminals of the counter 24 and the R-S flip-flop 25.

A clock output by the AND circuit 6 is supplied to the CPU 16, an acceleration-purpose input/output circuit 27 for the CPU 16 and peripheral circuits of the microcomputer 33 such as a timer circuit 28. The CPU 16 is connected to a high speed arithmetic circuit 26 for speeding up processing by the CPU 16.

Now, the operation for starting the oscillation of the ceramic oscillator 10 will be described.

It is when power is applied to the microcomputer 33 and when an external interruption signal is input in a clock halt mode that the oscillation of the ceramic oscillator 10 starts. In the clock halt mode, "L" is written in the control register 5 in response to a signal output by the CPU 16 so as to allow the Q output of the control register 5 to undergo a high-to-low transition, thereby stopping the oscillation of the ceramic oscillator 10. When an interruption signal is input from outside in the clock halt mode, the control register 5 is set to allow the Q output of the control register 5 to undergo a low-to-high transition. Herein, the case where the oscillation starts from the clock halt mode by an external interruption signal will be described referring to a diagram of waveforms of the respective outputs shown in FIG. 2.

When the OR circuit 4 receives an interruption signal, the output of the OR circuit 4 undergoes a low-to-high transition, thereby setting the control register 5 to allow the Q output to undergo a low-to-high transition. As a result, the ceramic oscillator 10 starts oscillating from the high level as is shown with a broken line in FIG. 2.

At the initial stage of the oscillation of the ceramic oscillator 10, an oscillation voltage has a small amplitude and exhibits an unstable waveform including higher order frequencies (by approximately three to four times). The unstable waveform is shaped by the inverter 2 as shown in FIG. 2. When the thus shaped waveform is directly used as a clock, the frequency is so high that an operation speed of an element cannot follow the clock cycle. This results in malfunction and run away of the microcomputer 33 and hinders the normal operation of the microcomputer 33.

Accordingly, in the conventional microcomputer, a clock is not output until the ceramic oscillator 10 attains stable oscillation. Specifically, the counter 24 counts up pulses shaped by the inverter 2 for a period of time required for the ceramic oscillator 10 to attain the stable oscillation, and the R-S flip-flop 25 is set in response to the overflow signal Q of the counter 24. At this point, the Q output of the R-S flip-flop 25 undergoes a low-to-high transition, thereby allowing a pulse shaped by the inverter 2 to be output as a clock from the AND circuit 6.

The counter 24 and the R-S flip-flop 25 are reset in the clock halt mode when the Q output of the control register 5 undergoes a high-to-low transition and the $\overline{\text{Q}}$ output thereof undergoes a low-to-high transition. In addition, when power is applied to the microcomputer 33, the counter 24 and the R-S flip-flop 25 are reset through the input of a signal $\overline{\text{RESET}}$ (at a low level; hereinafter abbreviated to "L") to the inverter 3 and the output (at a high level; hereinafter abbreviated to "H") from the inverter 3.

The ceramic oscillator 10, however, requires several tens μsec. (a quartz oscillator requires several msec. to 30 msec.) to attain the stable oscillation from the start of the oscillation. This time period is sufficiently long enough for the microcomputer to conduct several tens steps of an operation. Therefore, especially in a portable information equipment or the like that reduces power consumption by stopping a clock while the operation of a microcomputer is not necessary, this time period cannot be used for a returning operation since a clock is not output until the oscillation stabilizes, thereby delaying the returning operation by the microcomputer.

SUMMARY OF THE INVENTION

The present invention was devised to overcome the aforementioned problems. A first clock generation circuit of the invention comprises a frequency divider circuit for dividing a harmonic of a resonance frequency inherent in an oscillator which occurs at the initial stage of the oscillation of the oscillator into a frequency equal to or lower than that of the clock having the resonance frequency or that of the clock which is obtained by dividing the resonance frequency, and a selector circuit for selecting one output from the frequency divider circuit as a clock while the harmonic occurs.

A second clock generation circuit of the invention comprises a frequency divider circuit for dividing, by a plurality of dividing ratios, a harmonic of a resonance frequency inherent in an oscillator which occurs at the initial stage of the oscillation of the oscillator into a plurality of frequencies equal to or lower than a frequency of the clock having the resonance frequency or that of the clock which is obtained by dividing the resonance frequency; a selector circuit for selecting one output from the frequency divider circuit as the clock while the harmonic occurs; and switching means for allowing the selector circuit to select one frequency for the clock among the plurality of frequencies obtained by the frequency divider circuit.

A third clock generation circuit of the invention comprises a frequency divider circuit for dividing, by a plurality of dividing ratios, a harmonic of a resonance frequency inherent in an oscillator which occurs at the initial stage of the oscillation of the oscillator into a plurality of frequencies equal to or lower than that of the clock having the resonance frequency or that of the clock which is obtained by dividing the resonance frequency; a selector circuit for selecting one output from the frequency divider circuit as the clock while the harmonic occurs; and switching means for allowing the selector circuit to select one frequency for the clock among the plurality of frequencies obtained by the frequency divider circuit, in accordance with an operation state of a microcomputer.

The main objective of the invention is to provide a clock generation circuit, a microcomputer and a portable information apparatus, in which a time period from the application of power or an oscillation halt state to the start of the operation of a microcomputer in response to the supply of a clock shortens so as to quickly start processing of a program by the microcomputer, by dividing a harmonic of a resonance frequency of an oscillator occurring at the initial stage of the oscillation of the oscillator into a pulse having a frequency equal to or lower than that of a clock obtained at the stable oscillation of the oscillator and by utilizing the oscillation with the frequency as a clock for the operation of the microcomputer before the oscillation is stabilized.

Another objective of the invention is to provide a clock generation circuit, a microcomputer and a portable information apparatus, in which a clock can be switched without varying the configuration of the clock generation circuit in accordance with use conditions and without using another clock generation circuit with a different dividing ratio in accordance with the use conditions, and in which power consumption can be reduced by outputting a clock with a lower frequency when a high speed processing by the microcomputer is not required, by dividing a harmonic of a resonance frequency of an oscillator by a plurality of dividing ratios into a plurality of frequencies equal to or lower than a frequency of a clock obtained at the stable oscillation of the oscillator and by selecting a frequency among the plurality of frequencies for a clock for the operation of the microcomputer by using an external input signal or the like before the oscillation is stabilized.

Still another objective of the invention is to provide a clock generation circuit, a microcomputer and a portable information apparatus, in which power consumption can be reduced by outputting a clock with a lower frequency when a high speed processing by the microcomputer is not required, by dividing a harmonic of a resonance frequency of an oscillator by a plurality of dividing ratios into a plurality of frequencies equal to or lower than a frequency of a clock obtained at the stable oscillation of the oscillator and by selecting a frequency among the plurality of frequencies for a clock for the operation of the microcomputer by using an external input signal or a set value in a CPU before the oscillation is stabilized in accordance with the operation state of the microcomputer, for example between a case of the application of power which does not require a high speed clock and a case of the returning operation from a clock halt mode which requires a clock substantially equal to that obtained at the stable oscillation, or between a case of a higher level interruption which requires a rapid returning operation and a case of a lower level interruption which does not require a rapid returning operation.

The above and further objects and features of the invention will more fully be apparent from the following detailed description with accompanying drawings.

DETAILED DESCRIPTION OF THE INVENTION

[Embodiment 1]

Figure 1:
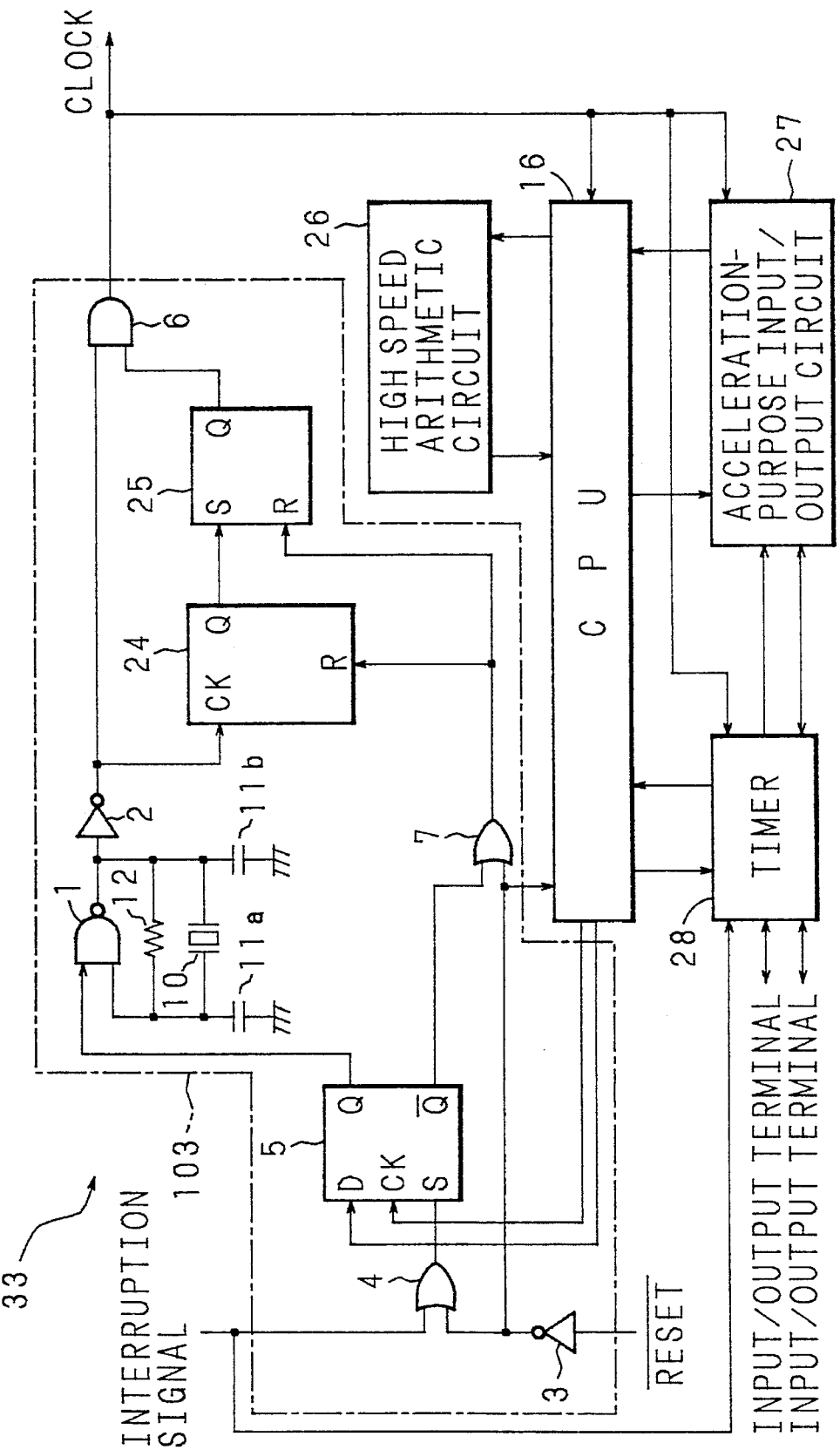
FIG. 1 is a block diagram showing the configuration of a conventional microcomputer mainly around a clock generation circuit therein.
Figure 2:
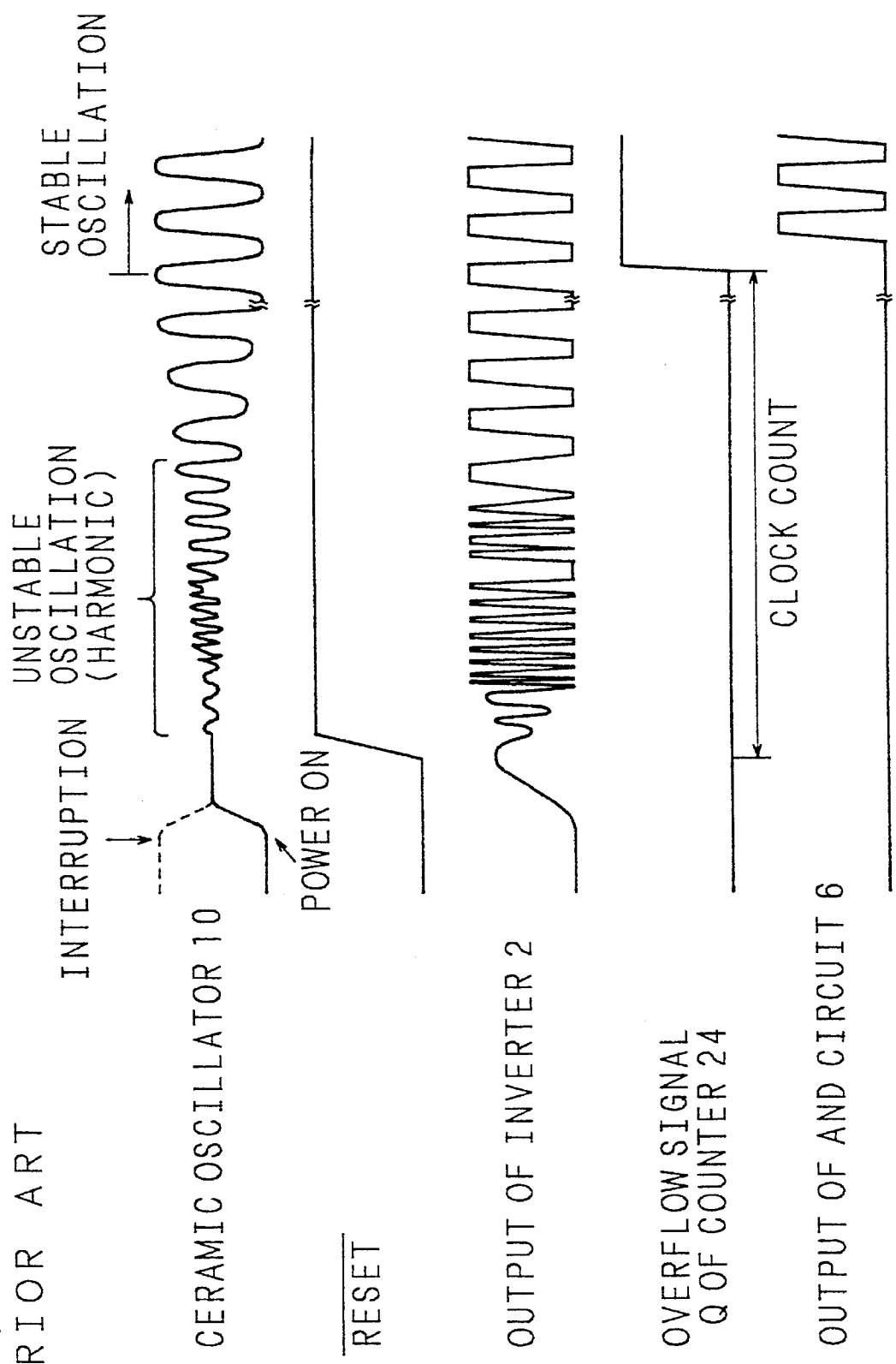
FIG. 2 is a diagram showing waveforms of respective outputs in the clock generation circuit of FIG. 1.
Figure 3:
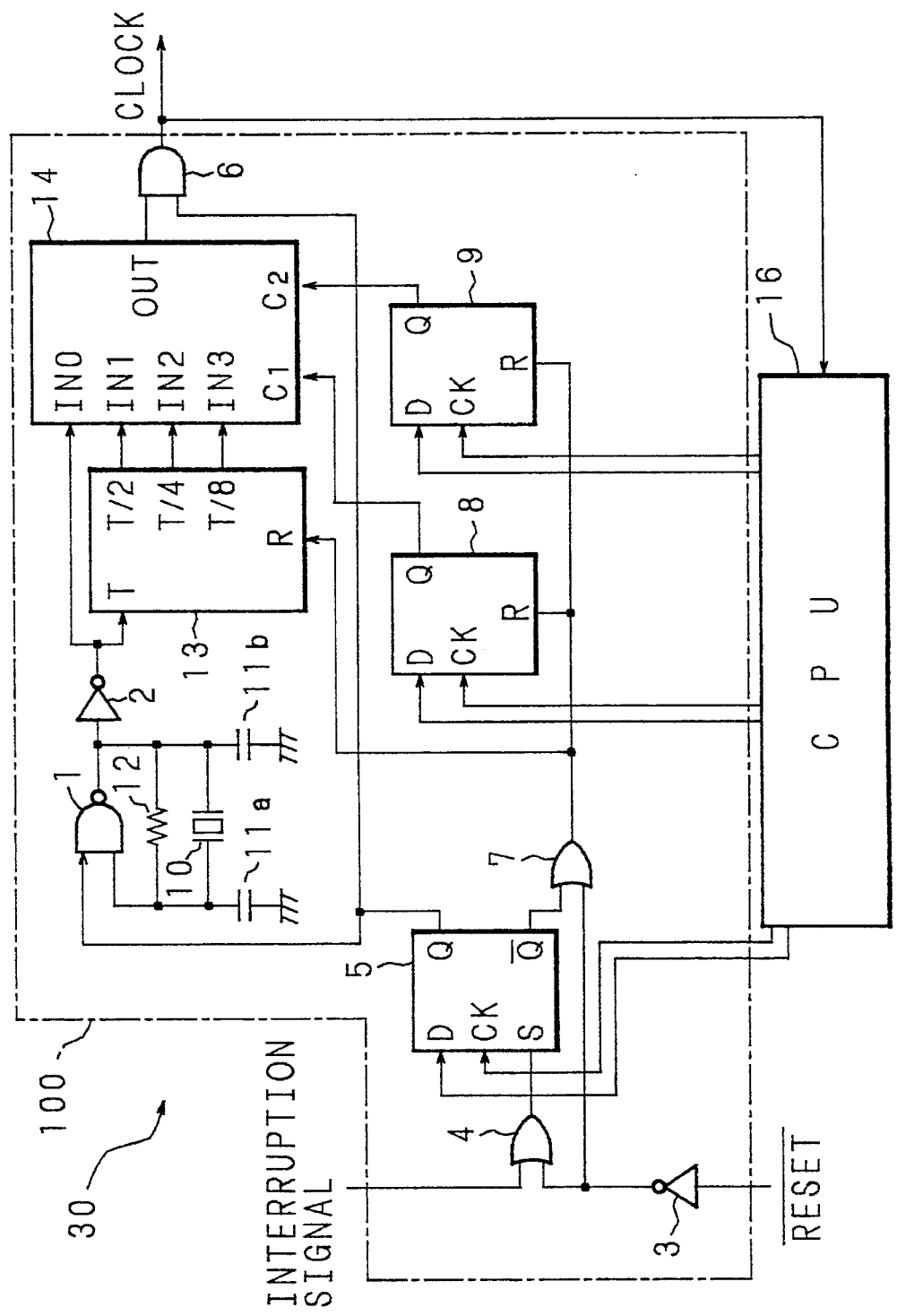
FIG. 3 is a block diagram showing the configuration of a microcomputer including a clock generation circuit according to one embodiment of the invention.

FIG. 3 is a block diagram showing the configuration of one embodiment of a clock generation circuit and a microcomputer including the clock generation circuit. As is shown in FIG. 3, a microcomputer 30 comprises a clock generation circuit 100. Each of the electrodes of a ceramic oscillator 10 is connected to each one terminal of load capacitances 11a and 11b which are grounded at the other terminals. A node between the ceramic oscillator 10 and the load capacitance 11a is connected to one input terminal of a NAND circuit 1. An output terminal of the NAND circuit 1 is connected to a node between the ceramic oscillator 10 and the load capacitance 11b. A negative feedback resistance 12 is interposed between the output terminal of the NAND circuit 1 and the one input terminal of the NAND circuit 1.

The other input terminal of the NAND circuit 1 is connected to a Q output terminal of a control register 5 for starting/stopping the oscillation of the ceramic oscillator 10. An S input terminal of the control register 5 is connected to an output terminal of an OR circuit 4 for outputting either an interruption signal or a reset signal for the microcomputer 30. The reset signal supplied to the OR circuit 4 is obtained by inverting a signal $\overline{RESET}$ by an inverter 3. A D input terminal and a clock (CK) input terminal of the control register 5 are connected to a CPU 16 of the microcomputer 30.

An oscillation voltage generated at the output terminal of the NAND circuit 1 by the ceramic oscillator 10 is buffered by an inverter 2 to be shaped into a pulse, which is supplied to a T input terminal of a frequency divider circuit 13. The frequency divider circuit 13 divides a frequency of the pulse received from the inverter 2 by two (T/2), by four (T/4) and by eight (T/8) thereby to output the divided signal to a selector 14. When the frequency divider circuit 13 being reset, the levels of all the output signals therefrom become low.

The T/2 output terminal, the T/4 output terminal and the T/8 output terminal of the frequency divider circuit 13 and the output terminal of the inverter 2 are respectively connected to an IN1 input terminal, an IN2 input terminal, an IN3 input terminal and an IN0 input terminal of the selector 14.

The selector 14, in accordance with signals received at C1 and C2 input terminals thereof, selectively outputs one of the signals received at the IN1 input terminal (selected when C1="H" and C2="L"), the IN2 input terminal (selected when C1="L" and C2="H"), the IN3 input terminal (selected when C1="L" and C2="L") and the IN0 input terminal (selected when C1="H" and C2="H"). An output terminal OUT of the selector 14 is connected to one input terminal of an AND circuit 6, the other input terminal of which is connected to the Q output terminal of the control register 5. A clock output by the AND circuit 6 is supplied to the CPU 16 and other elements in the microcomputer 30.

A $\overline{Q}$ output terminal of the control register 5 is connected to one input terminal of an OR circuit 7 having the other input terminal connected to an output terminal of the inverter 3. An output terminal of the OR circuit 7 is connected to an R input terminal of the frequency divider circuit 13 and R input terminals of control registers 8 and 9. Q outputs of the control registers 8 and 9 set signals received at the C1 and C2 input terminals of the selector 14, respectively. D input terminals and clock (CK) input terminals of the control registers 8 and 9 are connected to the CPU 16.

Figure 4:
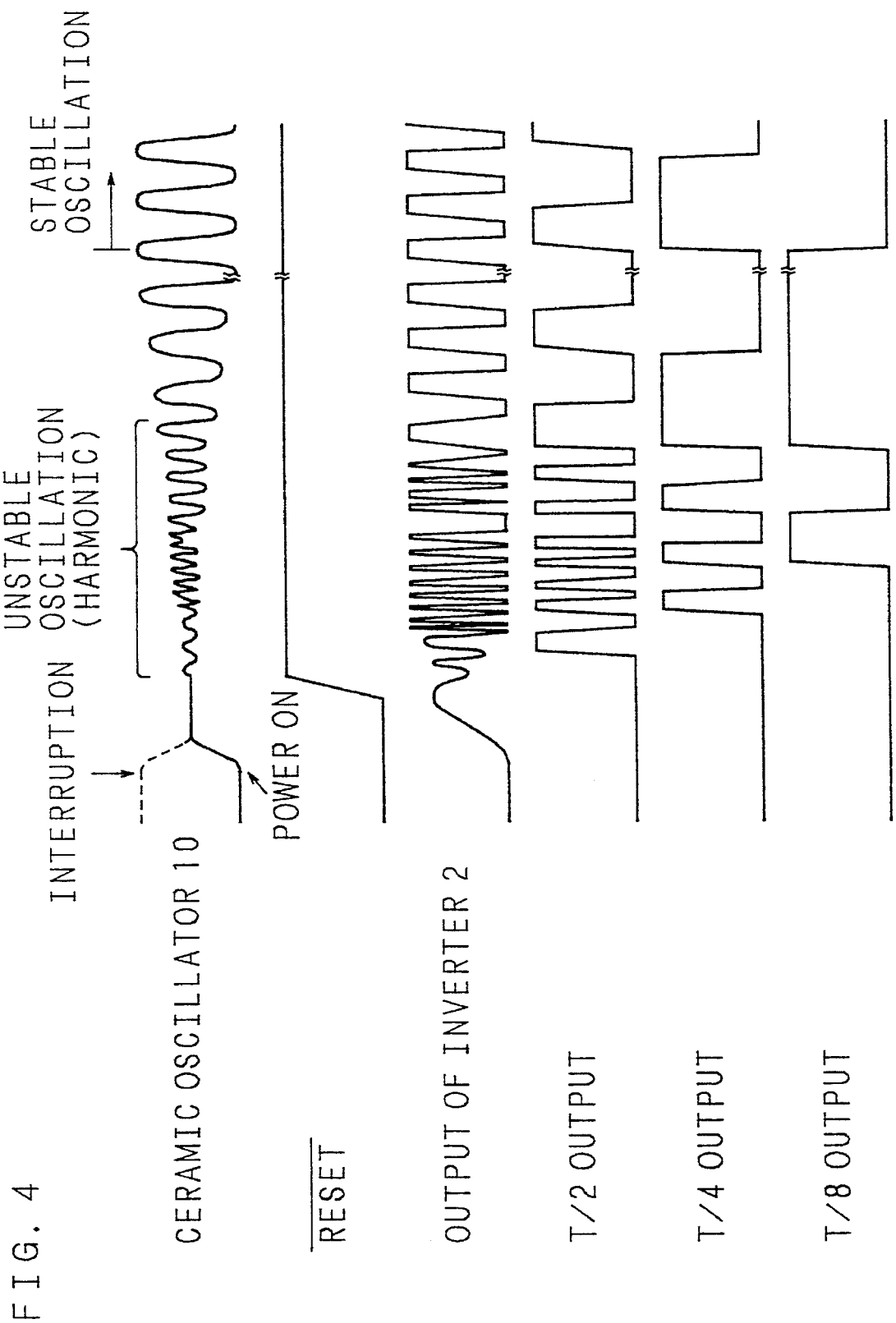
FIG. 4 is a diagram showing waveforms of respective outputs in the clock generation circuit of FIG. 3 or FIG. 5.

The operation of the clock generation circuit 100 and the microcomputer 30 will now be described referring to FIG. 4 showing the waveforms of the respective outputs therein.

It is when power is applied to the microcomputer 30 and when an external interruption signal is input in a clock halt mode that the ceramic oscillator 10 starts oscillation. In the clock halt mode, "L" is written in the control register 5 in response to a signal output by the CPU 16, thereby allowing the Q output of the control register 5 to undergo a high-to-low transition to stop the oscillation of the ceramic oscillator 10. When an external interruption signal is input in the clock halt mode, the control register 5 is set, thereby allowing the Q output of the control register 5 to undergo a low-to-high transition.

When power is applied to the microcomputer 30, a reset signal received by the OR circuits 4 and 7 is "H" since a signal $\overline{\text{RESET}}$ at the time of the application of power is "L". The signal $\overline{\text{RESET}}$ undergoes a low-to-high transition when an applied voltage becomes sufficiently high for the operation of respective circuits in the microcomputer 30.

The output signal "H" of the OR circuit 4, which is generated from the reset signal "H" obtained by inverting the signal $\overline{\text{RESET}}$ "L" by the inverter 3, sets the control register 5, thereby allowing the Q output of the control register 5 to undergo a low-to-high transition.

Similarly, the output signal "H" a high level) of the OR circuit 7, which is generated from the reset signal "H" obtained by inverting the signal $\overline{\text{RESET}}$ "L" by the inverter 3, resets the control registers 8 and 9, thereby allowing the Q outputs of the control registers 8 and 9 to undergo a high-to-low transition.

When the Q output of the control register 5 becomes "H", the ceramic oscillator 10 starts oscillation, which is initially unstable because of a harmonic of a resonance frequency and ultimately attains a stable condition with the resonance frequency. At this point, the output signal of the inverter 2 varies as is shown in FIG. 4, resulting in varying the output waveforms at the T/2 output terminal, T/4 output terminal and T/8 output terminal of the frequency divider circuit 13 also as is shown in FIG. 4.

When the Q output of the control register 5 becomes "H", the Q outputs of the control registers 8 and 9 are still "L". The selector 14 is so set as to select the IN3 input when the signals received at the C1 and C2 input terminals are "L", and hence, the selector 14 outputs a frequency divided wave signal received from the T/8 output terminal of the frequency divider circuit 13 at this point. This frequency divided signal is supplied to one input terminal of the AND circuit 6 which receives the Q output at a high level of the control register 5 at the other input terminal thereof, whereby the frequency divided signal is output as a clock from the output terminal of the AND circuit 6.

Although the frequency of the harmonic at the initial stage of the oscillation of the oscillator is approximately three to four times as high as the resonance frequency whereby the frequency of the clock generated from the frequency divided signal at the T/8 output terminal at the initial stage is approximately ⅜ to ½ of a normal clock by the resonance frequency, the microcomputer 30 normally operates. Accordingly, processing of a program can be conducted even in a period when the microcomputer 30 is inhibited to operate because of the absence of a clock in a conventional device.

After a time required for attaining the stable oscillation of the ceramic oscillator 10 (which is determined based on an accumulated number of clocks from the start of the oscillation), the CPU 16 writes the control registers 8 and 9 through the D input terminals, thereby resetting the inputs to the C1 and C2 input terminals of the selector 14. As a result, the selector 14 outputs the signal received from the T/2 or T/4 output terminal of the frequency divider circuit 13, thereby shortening a cycle of the clock output from the AND circuit 6 to a normal cycle.

In the clock halt mode, "L" is written in the control register 5 in response to a signal output by the CPU 16, thereby allowing the Q output of the control register 5 to undergo a high-to-low transition to stop the oscillation of the ceramic oscillator 10. At this point, a signal at the other input terminal of the NAND circuit 6 becomes "L", the $\overline{Q}$ output of the control register 5 becomes "H", and the output of the OR circuit 7 becomes "H". As a result, the frequency divider circuit 13 and the control registers 8 and 9 are reset, and the selector 14 selects the IN3 input.

It is when an external interruption signal is input or when a signal $\overline{\text{RESET}}$ is input that the microcomputer 30 returns from the clock halt mode. The operation conducted when a signal $\overline{\text{RESET}}$ is input is the same as that described above referring to the case where power is applied to the microcomputer 30.

When an interruption signal (which is significant at a high level) is input from outside, the output signal "H" of the OR circuit 4 sets the control register 5, thereby allowing the Q output of the control register 5 to undergo a low-to-high transition. As a result, the ceramic oscillator 10 starts oscillation from the high level as is shown with a broken line in FIG. 4. After the oscillation voltage becomes half of the supply voltage, the oscillation exhibits a waveform shown with a solid line in FIG. 4.

This oscillation varies from the unstable state oscillating a harmonic of a resonance frequency, to the stable state oscillating the resonance frequency. In this case, the output waveform of the inverter 2 varies as is shown in FIG. 4, thereby varying the output waveforms at the T/2 output terminal, T/4 output terminal and T/8 output terminal of the frequency divider circuit 13 as is shown in FIG. 4.

Since the selector 14 selects the IN3 input in the clock halt mode, the frequency divided signal received from the T/8 output terminal of the frequency divider circuit 13 shown in FIG. 4 is output when an interruption signal is input from outside. This frequency divided signal is output as a clock from the output terminal of the AND circuit 6 which receives the Q output "H" of the control register 5 at the other input terminal thereof.

The operation is conducted hereafter in the same manner as described above referring to the case where the power is applied to the microcomputer 30, and the same effects are achieved.

In this embodiment, a ⅛-frequency divided signal is output as a clock at the initial stage of the oscillation, which does not limit the invention. Any signal can be used as the clock as far as it is obtained by dividing the harmonic generated at the initial stage of the oscillation of the oscillator to have a frequency equal to or lower than that of a normal clock, i.e., a clock of the resonance frequency of the oscillator 10.

Furthermore, even in the case where the frequency of the harmonic is not nearly three to four times as high as the resonance frequency, the same effects can be achieved with a clock obtained by dividing the harmonic generated at the initial stage of the oscillation to have a frequency equal to or lower than that of the normal clock.

When the resonance frequency of the oscillator is approximately half of an operable frequency for the microcomputer, it is required to always select the ¼-frequency signal obtained from the harmonic at the initial stage of the oscillation. When the resonance frequency of the oscillator is approximately a quarter of the operable frequency for the microcomputer, it is required to always select the ½-frequency signal obtained from the harmonic at the initial stage of the oscillation.

[Embodiment 2]

Figure 5:
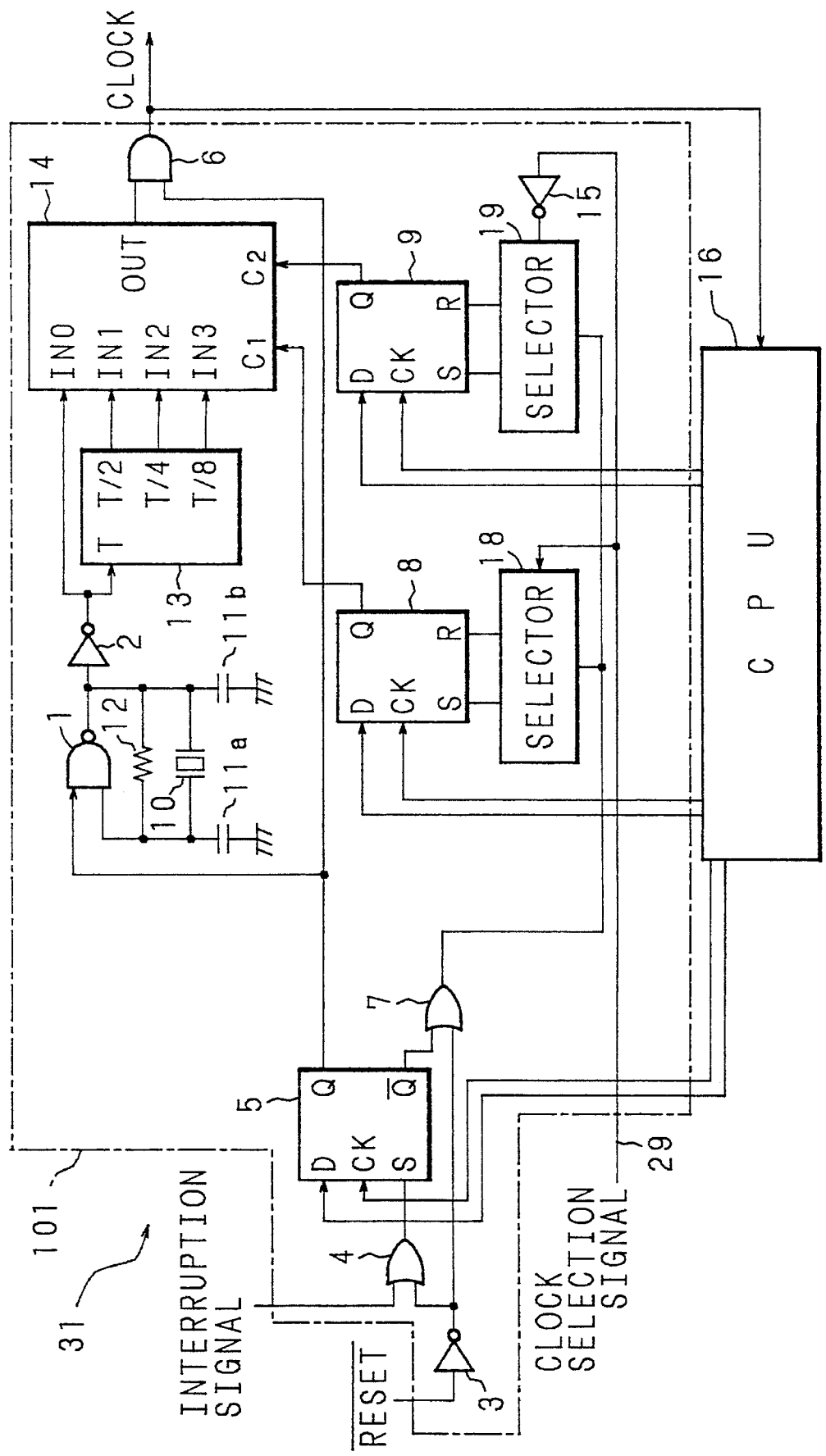
FIG. 5 is a block diagram showing the configuration of a microcomputer including a clock generation circuit according to another embodiment of the invention.

FIG. 5 is a block diagram showing the configuration of another embodiment of a clock generation circuit and a microcomputer including the clock generation circuit. As is shown in FIG. 5, a microcomputer 31 comprises a clock generation circuit 101. The clock generation circuit 101 comprises, in addition to the elements of the clock generation circuit 100 described in Embodiment 1, a clock selection signal line 29 for selecting a dividing ratio from outside of the microcomputer 31 for obtaining a clock. The clock selection signal line 29 is connected to a selector 18 which determines whether the output of the OR circuit 7 is to be supplied to an S input terminal or the R input terminal of the control register 8, in accordance with the level of a clock selection signal transferred through the clock selection signal line 29. The clock selection signal line 29 is also connected, via an inverter 15, to a selector 19 which determines whether the output of the OR circuit 7 is to be supplied to an S input terminal or the R input terminal of the control register 9, in accordance with the level of the clock selection signal.

The selector 18 sets the control register 8 when the clock selection signal is "H", and resets the control register 8 when the clock selection signal is "L". Since the selector 19 receives an inverted signal of the clock selection signal owing to the inverter 15, the selector 19 resets the control register 9 when the clock selection signal is "H" and sets the control register 9 when the clock selection signal is "L". Thus, the selector 19 operates reversely to the selector 18. The remaining configuration is similar to that of the clock generation circuit 100 and the microcomputer 30 described in Embodiment 1, and hence the description is omitted.

The operation of the clock generation circuit 101 and the microcomputer 31 will now be described referring to the waveforms of the respective outputs shown in FIG. 4.

When a signal $\overline{\text{RESET}}$ ("L") is input at the application of power, or when the microcomputer 31 is shifted to the clock halt mode, the $\overline{Q}$ output "H" of the control register 5 is output through the OR circuit 7. At this point, the selector 18 sets or resets the control register 8 depending on whether the clock selection signal is "H" or "L", and the selector 19 operates reversely to the selector 18 to reset or set the control register 9.

When the clock selection signal is "H", the output of the OR circuit 7 is supplied to the S input terminal of the control register 8 and the R input terminal of the control register 9. Therefore, the control register 8 is set and the control register 9 is reset. As a result, the selector 14 selects the IN1 input terminal, thereby allowing the AND circuit 6 to output a ½-frequency signal (T/2) shown in FIG. 4 as a clock at the initial stage of the oscillation of the ceramic oscillator 10.

When the clock selection signal is "L", the output of the OR circuit 7 is supplied to the R input terminal of the control register 8 and the S input terminal of the control register 9. Therefore, the control register 8 is reset and the control register 9 is set. As a result, the selector 14 selects the IN2 input terminal, thereby allowing the AND circuit 6 to output a ¼-frequency signal (T/4) shown in FIG. 4 as a clock at the initial stage of the oscillation of the ceramic oscillator 10.

In the clock generation circuit 101 and the microcomputer 31, when the oscillator is replaced with another oscillator with a different oscillation frequency, a more appropriate clock can be set from outside at the initial stage of the oscillation of the ceramic oscillator 10 in accordance with various use conditions, e.g., when the operable frequency for the microcomputer 31 is decreased due to the decrease of the supply voltage. For example, when the resonance frequency of the oscillator is approximately half of the operable frequency for the microcomputer, the circuit 101 is to be set to always select the ¼-frequency signal at the initial stage of the oscillation with the use of the clock selection signal line 29. When the resonance frequency of the oscillator is approximately a quarter of the operable frequency for the microcomputer, the circuit 101 is to be set to always select the ½-frequency signal at the initial stage of the oscillation with the use of the clock selection signal line 29. Accordingly, it is possible to switch the clock without changing the configuration in accordance with the use conditions and without using a different clock generation circuit with a different dividing ratio in accordance with the use conditions.

Although the clock selection signal line is one in this embodiment, it is possible to provide a plurality of clock selection signal lines as far as a frequency of the clock is set so as not to exceed the operable frequency for the microcomputer during the unstable oscillation.

Furthermore, it is possible to set a larger dividing ratio or another dividing ratio such as ⅓ and ⅕ in the frequency divider circuit, so as to control the clock more finely.

[Embodiment 3]

Figure 6:
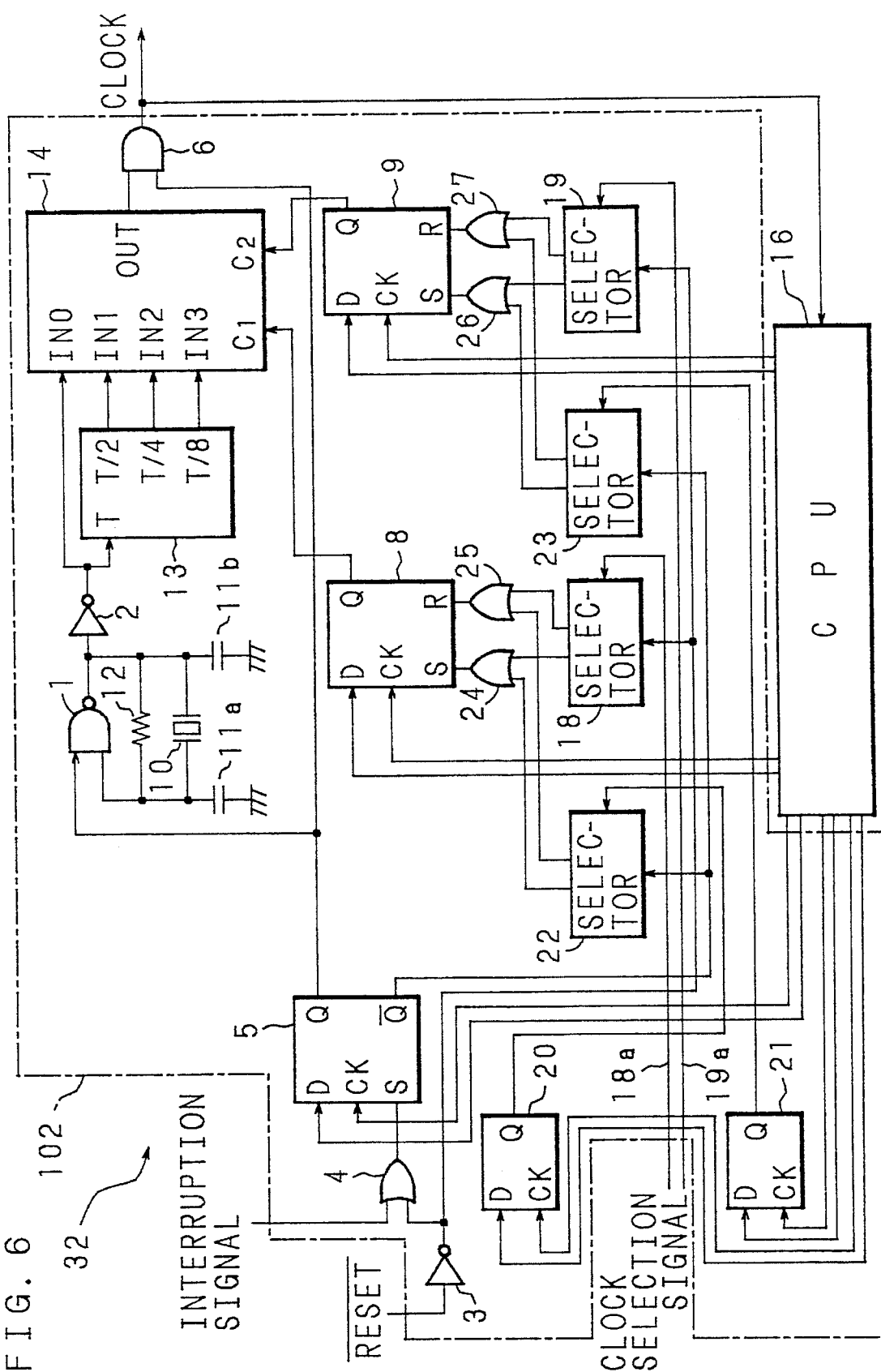
FIG. 6 is a block diagram showing the configuration of a microcomputer including a clock generation circuit according to still another embodiment of the invention.

FIG. 6 is a block diagram showing the configuration of still another embodiment of a clock generation circuit and a microcomputer including the clock generation circuit. As is shown in FIG. 6, a microcomputer 32 comprises a clock generation circuit 102. This clock generation circuit 102 comprises, in addition to the elements of the clock generation circuit 100 described in Embodiment 1, clock selection signal lines 18a and 19a for selecting from outside of the microcomputer 32 a dividing ratio for obtaining a clock.

The clock selection signal line 18a is connected to a selector 18 which determines whether a reset signal output by the inverter 3 is to be supplied to the S input terminal or the R input terminal of the control register 8, in accordance with the level of a signal transferred through the clock selection signal line 18a. The clock selection signal line 19a is connected to a selector 19 which determines whether the reset signal output by the inverter 3 is to be supplied to the S input terminal or the R input terminal of the control register 9, in accordance with the level of a signal transferred through the clock selection signal line 19a.

D input terminals and clock (CK) input terminals of registers 20 and 21 are connected to the CPU 16 of the microcomputer 32. The registers 20 and 21 are respectively supplied by the CPU 16 with set values to be written in the control registers 8 and 9 for selecting dividing ratios used in returning the microcomputer 32 from the clock halt mode in response to an interruption signal. A Q output terminal of the register 20 is connected to a selector 22 which determines whether the $\overline{Q}$ output of the control register 5 is to be supplied to the S input terminal or the R input terminal of the control register 8. A Q output terminal of the register 21 is connected to a selector 23 which determines whether the $\overline{Q}$ output of the control register 5 is to be supplied to the S input terminal or the R input terminal of the control register 9.

The selectors 18 and 22 are connected to the S input terminal of the control register 8 via an OR circuit 24 and to the R input terminal of the control register 8 via an OR circuit 25.

The selectors 19 and 23 are connected to the S input terminal of the control register 9 via an OR circuit 26 and to the R input terminal of the control register 9 via an OR circuit 27.

The OR circuit 7 for ORing the $\overline{Q}$ output of the control register 5 with the reset signal output by the inverter 3, which is used in Embodiment 1, is not provided in this embodiment. The remaining configuration is similar to that of the clock generation circuit 100 and the microcomputer 30 described in Embodiment 1, and hence the description is omitted.

The clock generation circuit 102 switches the dividing ratio to be selected by the selector 14 through an external setting or by the CPU 16 depending on whether power is applied to the microcomputer 32 or an external interruption signal is input in the clock halt mode. In the clock halt mode, the CPU 16 writes "L" in the control register 5, thereby allowing the Q output of the control register 5 to undergo a high-to-low transition to stop the oscillation of the ceramic oscillator 10. When an interruption signal is input from outside in the clock halt mode, the control register 5 is set, thereby allowing the Q output of the control register 5 to undergo a low-to-high transition.

When a signal $\overline{RESET}$ ("L") is input at the application of power, the Q outputs of the control registers 8 and 9 are respectively set to be prescribed values, in accordance with the levels of the clock selection signals transferred through the clock selection signal lines 18a and 19a. Specifically, when the signal through the clock selection signal line 18a is "H", the control register 8 is set to supply the Q output "H", and when the signal is "L", the control register 8 is reset to supply the Q output "L". When the signal through the clock selection signal line 19a is "H", the control register 9 is set to supply the Q output "H", and when the signal is "L", the control register 9 is reset to supply the Q output "L". Through the combination of the levels of the Q outputs of the control registers 8 and 9, such frequency divided signal is selected by the selector 14 to attain the operable frequency for the microcomputer 32, and the signal with that frequency is output as a clock.

When the microcomputer 32 is shifted to the clock halt mode, the Q outputs of the control registers 8 and 9 are respectively set to be prescribed values not by the clock selection signals, but by the Q outputs of the registers 20 and 21 set by the CPU 16, so as to select a desired frequency divided signal to be output by the selector 14. This frequency divided signal is selected so that the microcomputer 32 can attain the operable frequency when returning from the clock halt mode.

In this manner, when returning from the clock halt mode, the frequency divided signal output by the selector 14 that can operate the microcomputer 32 is selected and output as a clock with the operable frequency, and the selected signal is different from one selected in the case where power is applied to the microcomputer 32. The rest of the operation is similar to that of the clock generation circuit 100 and the microcomputer 30 described in Embodiment 1, and hence the description is omitted.

The clock generation circuit 102 is effective especially when the operable frequency for the microcomputer largely varies, that is when the supply voltage is different in supplying power to the microcomputer 32 to input a signal $\overline{RESET}$ and in returning from the clock halt mode. For example, when the present clock generation circuit and microcomputer are applied to a portable information apparatus with two power supplies for backup and operation, e.g., a notebook type personal computer and a portable telephone, the backup power such as batteries, i.e., the power with a lower voltage than that of the operation power, is first connected when the equipment is switched on. Under this condition, a clock obtained by a large dividing ratio and having a frequency several times as low as an operable frequency for a circuit in the latter stage is output. Thus, the consumption of the backup power can be reduced.

Furthermore, in returning from the clock halt mode by using the operation power, a clock having a frequency approximate to the operable frequency for the circuit in the latter stage is output, thereby realizing a rapid return from the clock half mode.

Although a pair of interruption signals and a pair of the registers 20 and 21 for setting the clock dividing ratios in returning from the clock halt mode are used in this embodiment, pairs of the interruption signals and registers can be used. In this case, the dividing ratio in returning from the clock halt mode can be more finely set in accordance with the levels of the interruption signals. The frequency of a clock used at a higher level interruption requiring a rapid return can be set to be higher than the frequency of a clock used at a lower level interruption not requiring a rapid return. As a result, an amount of current consumed in the interruption not requiring a rapid return can be reduced.

The oscillators are not limited to the ceramic oscillators described in the foregoing embodiments, but can be any type of oscillators including a quartz oscillator and an LC oscillator.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A clock generation circuit for generating a clock from oscillation of an oscillator by applying a voltage to the oscillator, comprising:

a frequency divider circuit for dividing a harmonic of a resonance frequency inherent in the oscillator which occurs at an initial stage of the oscillation of the oscillator into a frequency equal to or lower than a frequency of the clock having the resonance frequency or a frequency of the clock which is obtained by dividing the resonance frequency; and a selector circuit for selecting one output from the frequency divider circuit as the clock while the harmonic occurs.

2. A microcomputer including the clock generation circuit of claim 1.

3. A portable information apparatus with the microcomputer of claim 2 incorporated therein.

4. A clock generation circuit for generating a clock from oscillation of an oscillator by applying a voltage to the oscillator, comprising:

a frequency divider circuit for dividing, by a plurality of dividing ratios, a harmonic of a resonance frequency inherent in the oscillator which occurs at an initial stage of the oscillation of the oscillator into a plurality of frequencies equal to or lower than a frequency of the clock having the resonance frequency or a frequency of the clock which is obtained by dividing the resonance frequency;

a selector circuit for selecting one frequency from the frequency divider circuit as the clock while the harmonic occurs; and switching means for allowing the selector circuit to select one frequency for the clock among the plurality of frequencies obtained by the frequency divider circuit.

5. A microcomputer including the clock generation circuit of claim 4.

6. A portable information apparatus with the microcomputer of claim 5 incorporated therein.

7. The clock generation circuit according to claim 4, further comprising means for inputting an external signal, wherein the switching means allows the selector circuit to select one frequency in accordance with a set level in response to the external signal.

8. A microcomputer including the clock generation circuit of claim 7.

9. A portable information apparatus with the microcomputer of claim 8 incorporated therein.

10. A clock generation circuit for generating a clock from oscillation of an oscillator by applying a voltage to the oscillator and supplying the clock to another circuit in a microcomputer, comprising:

a frequency divider circuit for dividing, by a plurality of dividing ratios, a harmonic of a resonance frequency inherent in the oscillator which occurs at an initial stage of the oscillation of the oscillator into a plurality of frequencies equal to or lower than a frequency of the clock having the resonance frequency or a frequency of the clock which is obtained by dividing the resonance frequency;

a selector circuit for selecting one frequency from the frequency divider circuit as the clock while the harmonic occurs; and switching means for allowing the selector circuit to select one frequency for the clock among the plurality of frequencies obtained by the frequency divider circuit, in accordance with an operation state of the microcomputer.

11. A microcomputer including the clock generation circuit of claim 10.

12. A portable information apparatus with the microcomputer of claim 11 incorporated therein.

13. The clock generation circuit according to claim 10, further comprising means for inputting a set value by a CPU in the microcomputer, wherein the switching means allows the selector circuit to select one frequency in accordance with the set value from the CPU.

14. A microcomputer including the clock generation circuit of claim 13.

15. A portable information apparatus with the microcomputer of claim 14 incorporated therein.

16. The clock generation circuit according to claim 10, further comprising means for inputting an external signal, wherein the switching means allows the selector circuit to select one frequency in accordance with a level of the external signal.

17. A microcomputer including the clock generation circuit of claim 16.

18. A portable information apparatus with the microcomputer of claim 17 incorporated therein.

* * * * *